United States Patent [19]

Kano

[11] 4,357,650

[45] Nov. 2, 1982

[54] LICENSE PLATE HOLDER

[75] Inventor: Hisaei Kano, Tokorozawa, Japan

[73] Assignee: Nissan Motor Co., Ltd., Yokohama, Japan

[21] Appl. No.: 194,787

[22] Filed: Oct. 7, 1980

[30] Foreign Application Priority Data

Oct. 9, 1979 [JP] Japan .............................. 54/131240

[51] Int. Cl.³ .............................................. F21V 33/00
[52] U.S. Cl. .................................... 362/234; 262/249;
362/253; 362/367; 362/368; 362/80; 362/82
[58] Field of Search ................... 362/80, 82, 249, 234,
362/253, 367, 368

[56] References Cited

U.S. PATENT DOCUMENTS 2,167,791  8/1939  Wyatt ..................................... 362/82
3,754,131  8/1973  Di Salvo .............................. 362/82

Primary Examiner—Stephen J. Lechert, Jr.

[57] ABSTRACT

A license plate holder at the rear panel of a vehicle body includes a plate holder member on which the license plate and illuminating lamps therefor are mounted. The plate holder member has a central opening in which connection of electrical lead wires from the illuminating lamps is made. The plate holder member is provided with a reinforcing flange extending along the periphery of the central opening and protruding toward the rear panel. The plate holder member is formed with a first opening on its front surface, which permits passage of connectors at the free end of the lead wires. This opening is in communication with a second opening at the intersection of the front surface and the reinforcing flange. The second opening permits passage of the lead wires, and prevents passage of the connectors. The first and second openings provide uninterrupted rear edge of the reinforcing flange.

2 Claims, 7 Drawing Figures

LICENSE PLATE HOLDER

BACKGROUND OF THE INVENTION

1. Field of the Invention:

The present invention relates to a license plate holder at the rear panel of a vehicle body.

2. Description of the Prior Art:

Generally, a rear panel of the vehicle body is formed as a curved or stepped surface on which a license plate and illumination lamps therefor are separately mounted. Thus, the license plate cannot be mounted directly on the rear panel in a stable manner, so that it has been a conventional practice to secure on the rear panel of the vehicle body a suitable holder in the form of brackets or the like to define a plane on which the license plate is mounted. A pair of lamps for illuminating the license plate are disposed on both sides of the license plate, and mounted directly on the rear panel. To this end, the lamps must be so molded as to provide a bottom surface which conforms with the curved or stepped surface of the rear panel. Consequently, a number of types of illumination lamps must be prepared for various kinds of vehicles having different shapes or curvatures at the rear panel, which is disadvantageous from the viewpoint of parts stock control and manufacturing cost.

Such a drawback can be eliminated by a license plate holder disclosed in the U.S. patent application Ser. No. 185,475 filed on Sept. 9, 1980 by claiming the priority of Japanese Patent Application No. 116,347/79 dated Sept. 11, 1979, and assigned to the assignee of the present application.

The license plate holder according to the above-mentioned prior application is shown in FIGS. 1 to 3, and includes a plate holder member 1 affording a surface 2 which is to mount thereon a license plate (not shown) and on both sides thereof a pair of illuminating lamps 5. The plate holder member 1 has a central opening 3 which facilitates the connecting operation between connectors 10 of electrical lead wires 7 from the lamps 5, and connectors 9 of lead wires 8 from the vehicle body panel 6. The plate holder member 1 is reinforced by a flange 4 which extends along the periphery of the opening 3 and protrudes from the rear side of the member 1.

When the license plate holder is mounted on the panel 6 with the lead wires 7 and connectors 10 positioned in the opening 3, the lead wires 7 may be clamped between the edge of the flange 4 and the panel 6, by which the mechanical durability of the lead wires 7 deteriorates. Thus, the flange 4 is formed with a cutout 11 through which the lead wires 7 are passed without being clamped between the flange 4 and the panel 6.

However, formation of such a cutout in the flange is disadvantageous in the following points. Firstly, in order to accurately align the lead wires 7 with the cutout 11, the lead wires have to be fixed, e.g. adhered to the rear surface of the plate holder member or to the rear panel of the vehicle body, before the mounting operation of the license plate holder. Still, the lead wires 7 may be removed out of the cutout 11 during the positioning of the holder so that the lead wires 7 may be clamped between the rear panel and that position of the edge of the flange 4 which is not formed with the cutout. Secondly, the intended reinforcement of the holder member 1 cannot be achieved by the flange 4 formed with the cutout. The holder member 1 has a reduced rigidity against a torsional force about an axis which intersects at right angle with the longitudinal center axis of the holder member 1, and which passes the cutout 11.

SUMMARY OF THE INVENTION

Therefore, it is an object of the present invention to provide an improved license plate holder, which eliminates the above mentioned disadvantages.

According to the present invention, there is provided a license plate holder for mounting a license plate on a rear panel of a vehicle body, comprising a plate holder member which affords a flat front surface to which the license plate and at least one illuminating lamp are secured, said plate holder member having a central opening and a reinforcing flange which extends along the periphery of the central opening and protrudes rearwardly toward the rear panel of the vehicle body, said illuminating lamp being connected with a lead wire having a connector at its free end, wherein said plate holder member is formed with a first opening on said front surface, which is wide enough for passing therethrough said connector of the lead wire, a second opening at the intersection of the front surface and the reinforcing flange, which is wide enough for passing therethrough said lead wire, but which prevents passage of said connector, said first and second openings being in communication with each other, whereby said lead wire is passed from the rear side of the plate holder member through the first opening, and moved into the second opening such that the connector of the lead wire can be connected in said central opening with a connector of lead wire which is passed through said rear panel of the vehicle body into the interior thereof.

DETAILED EXPLANATION OF THE PREFERRED EMBODIMENT

Figure 1:
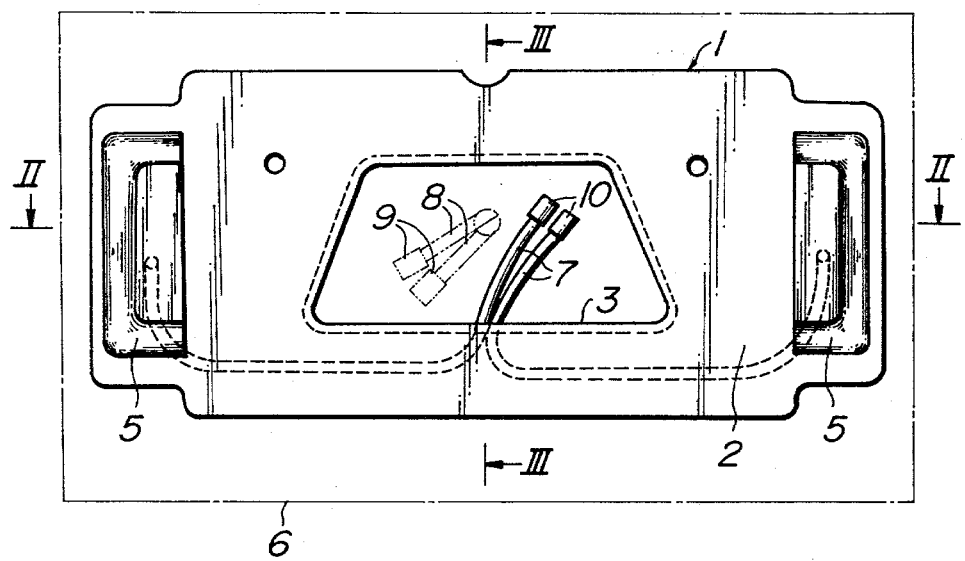
FIG. 1 is a front view of one example of the license plate holder which has been referred to hereinbefore and which is to be improved by the present invention.

Referring now to FIGS. 4 to 7, there is shown a license plate holder according to one preferred embodiment of the present invention. Reference numerals used in FIGS. 1 to 3 denote the same or corresponding components.

The license plate holder according to the present invention comprises a plate holder member 1 which provides a license plate mounting surface 2 having a central opening 3. The plate holder member 1 has a reinforcing flange 4 which extends along the periphery of the opening 3 and protrudes rearwardly, i.e. toward the rear panel 6 of the vehicle body. A pair of illuminating lamps 5 are mounted on both sides of the license plate mounting surface 2. Those lamps 5 are connected to the vehicle-mounted battery (not shown) through lead wires 7 which extend along the rear surface of the plate holder member 1, connectors 10 and 9 which are connected with each other in the central opening 3, and lead wires 8 which are passed through the rear panel into the interior of the vehicle body.

Figure 2:
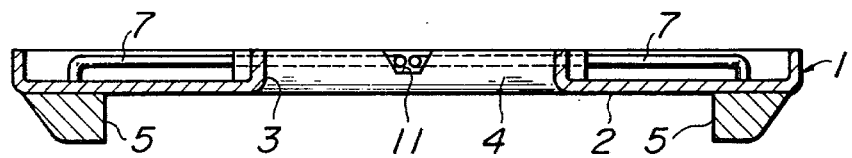
FIG. 2 is a longitudinal sectional view taken along the line II—II in FIG. 1.
Figure 3:
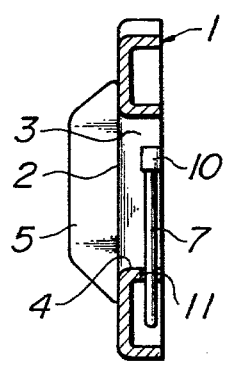
FIG. 3 is a cross sectional view taken along the line III—III in FIG. 1.
Figure 4:
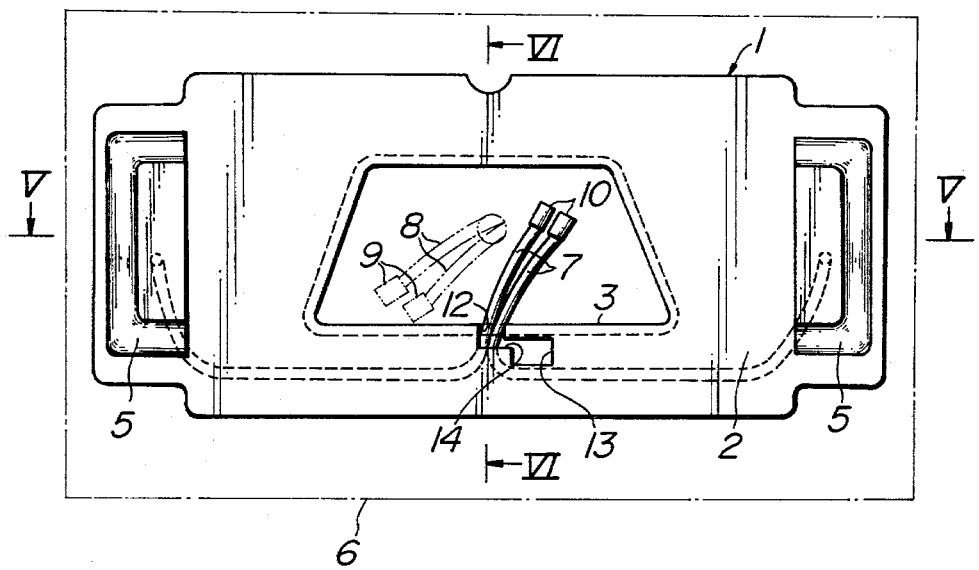
FIG. 4 is a front view of the license plate holder according to one preferred embodiment of the present invention.
Figure 5:
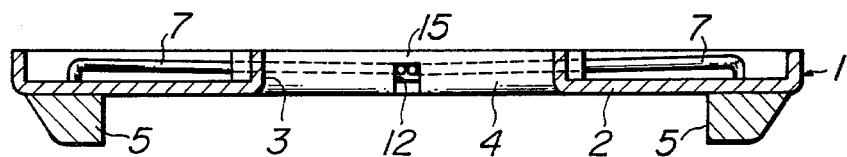
FIG. 5 is a longitudinal sectional view taken along the line V—V in FIG. 4.
Figure 6:
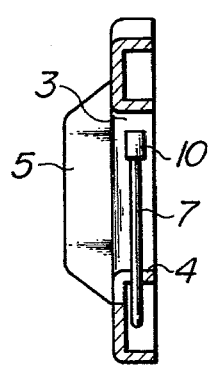
FIG. 6 is a cross sectional view taken along the line VI—VI in FIG. 4.
Figure 7:
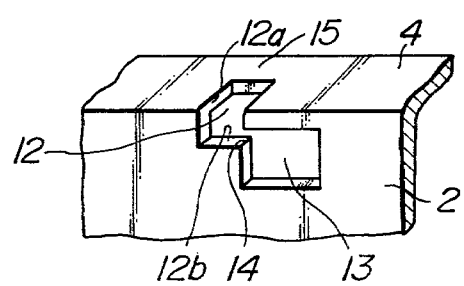
FIG. 7 is a fragmentary perspective view showing the opening for passing the lead wire connected to the illuminating lamp of the license plate holder.

According to the present invention, the flange 4 is not formed with cutout 11, as shown in FIGS. 1 to 3, for passing the lead wires 7. Instead, the plate holder member is formed with an opening 12 at the intersection of the license plate mounting surface 2 and the flange 4. As shown in FIG. 7, the opening 12 is arranged such that a portion 12a of its periphery lies on the flange 4, and the rest portion 12b of the periphery lies on the surface 2. The plate holder member 1 is further formed with an opening 13 on the surface 2, which communicates with the opening 12 through a relatively narrow neck portion 14.

The area of the opening 12 is substantially the same as, or slightly greater than twice the cross-sectional area of a lead wire 7, but less than the cross-sectional area of a connector 10. The opening 13 has an area which permits the passage of at least one lead wire 7 and one connector 10. Preferably, the area of the opening 13 is more than twice the cross-sectional area of a connector 10. The neck portion 14 has a width which is slightly greater than the width of a lead wire.

With the above-mentioned arrangement, the illuminating lamps 5 are mounted on the front surface of the plate holder member 1 with the lead wires 7 passed through the member 1 and extended along the rear surface of the member 1. The connectors 10 at the ends of the lead wires 7 are passed through the opening 13 successively or simultaneously, from the rear surface side to the front surface side of the member 1. Then, each lead wire 7 is moved from the opening 13 to the opening 12 through the neck portion 14. By this, the connectors 10 are introduced into the central opening 3 of the member 1 together with the desired length of the lead wires 7. The plate holder member 1 with the illuminating lamps 5 mounted thereon can now be secured to the rear panel 6 of the vehicle body, and the connectors 10 in the central opening 3 can be connected to the vehicle body side connectors 9.

According to the present invention, the lead wires 7 connected to the illuminating lamps 5 and extending along the rear surface of the plate holder member 1 are guided into the central opening 3 through the opening 12 at the cted to the illuminating lamps 5 and extending along the rear surface of the plate holder member 1 are guided into the central opening 3 through the opening 12 at the intersection of the front surface 2 and the flange 4 of the member 1, and not across the cutout at the rear edge of the flange 4. Thus, an accurate positioning of the lead wires 7 with respect to the flange is not required, and the lead wires 7 are prevented from being clamped between the rear panel 6 of the vehicle body and the rear edge of the flange 4.

Moreover, as clearly shown in FIG. 7, the opening 12 does not extend as far as the rear edge of the flange 4, and leaves a bridge 15 connecting the material of the flange 4 on both sides of the opening 12. This bridge 15 ensures that the rear edge of the flange extends along the periphery of the opening 3 continuously without being interrupted. By this, the flange 4 provides the plate holder member 1 with sufficient rigidity. In other words, the rigidity of the member 1 need not be sacrificed for passing the lead wires 7 through the flange 4.

Another advantage obtained by the present invention is that the lead wires 7 positioned in the opening 12 cannot be readily removed therefrom, since the area of the opening 12 prevents passage of the connector 10 in the axial direction.

It will be appreciated that, according to the present invention, undesirable clamping of the lead wires can be positively prevented without deteriorating the rigidity of the plate holder member. The license plate holder can be mounted on the rear panel of the vehicle body in a very simple manner, by using appropriate fastners. The flat front surface of the plate holder member enables the license plate to be mounted stably, even when the rear panel of the vehicle body is uneven. The bottom surface of the illuminating lamps are supported by the front surface of the plate holder member, so that they need not be modified to conform with uneven rear panel of the vehicle body. This permits utilization of standardized illuminating lamps, and serves to reduce the cost.

The present invention can be carried into practice in various manners, and is not limited to the illustrated embodiment. For example, the openings for passing the lead wires, which are shown as being substantially rectangular, may be circular.

What is claimed is:

1. A license plate holder for mounting a license plate on a rear panel of a vehicle body, comprising a plate holder member which affords a flat front surface to which the license plate and at least one illuminating lamp are secured, said plate holder member having a central opening and a reinforcing flange which extends along the periphery of the central opening and protrudes rearwardly toward the rear panel of the vehicle body, said illuminating lamp being connected with a lead wire having a connector at its free end, wherein said plate holder member is formed with a first opening on said front surface, which is wide enough for passing therethrough said connector of the lead wire, a second opening at the intersection of the front surface and the reinforcing flange, which is wide enough for passing therethrough said lead wire, but which prevents passage of said connector, said first and second openings being in communication with each other, whereby said lead wire is passed from the rear side of the plate holder member through the first opening, and moved into the second opening such that the connector of the lead wire can be connected in said central opening with a connector of a lead wire which is passed through said rear panel of the vehicle body into the interior thereof.

2. The license plate holder as claimed in claim 1, wherein a pair of illuminating lamps are mounted on the front surface of the plate holder member, said first opening having a cross-sectional are which permits passage of at least one connector and one lead wire, said second opening having a cross-sectional area which permits passage of two lead wires, said first and second openings being communicated with each other through a neck portion which permits passage of one lead wire.

* * * * *